Dec. 13, 1955  L. STANETZKI  2,726,900
WHEEL FASTENINGS FOR MOTOR AND OTHER VEHICLES
Filed Jan. 9, 1950  2 Sheets-Sheet 1
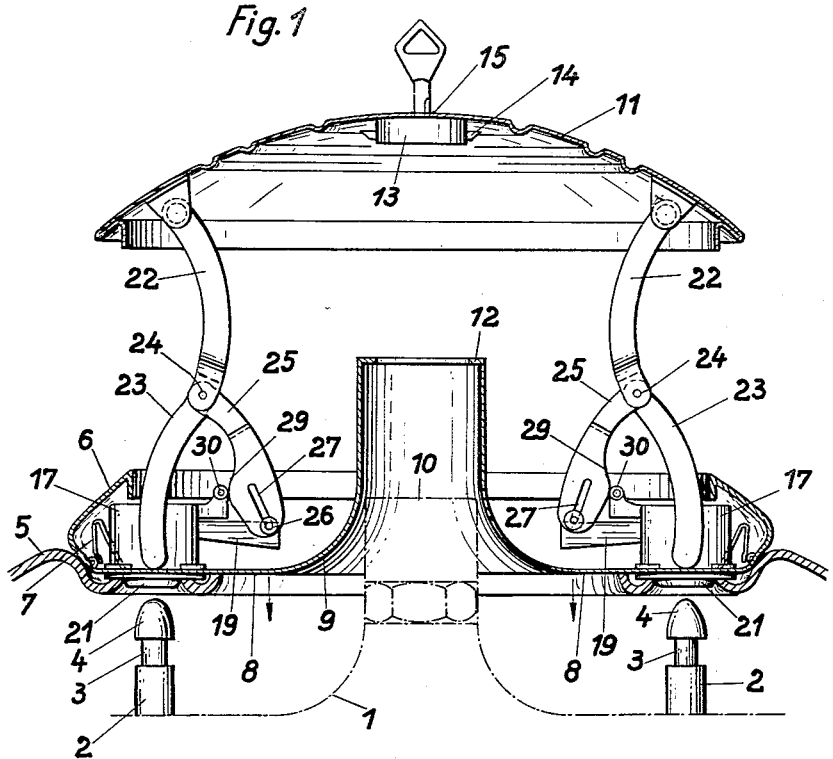
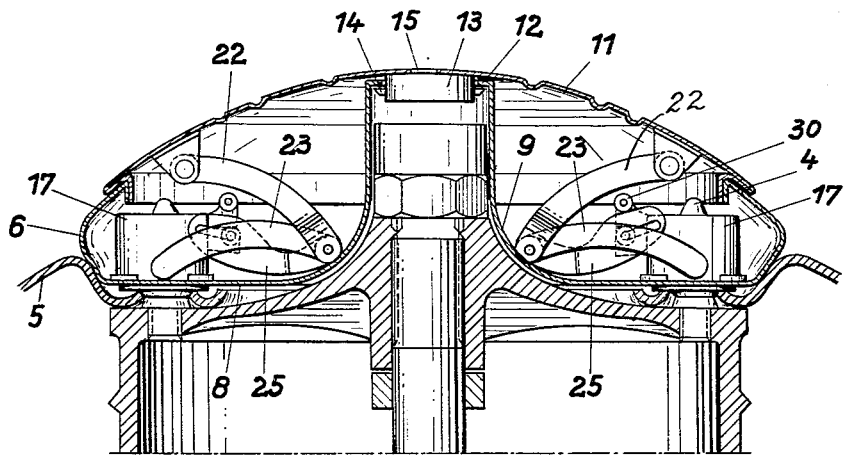
Inventor
Lothar Stanetzki
By Frank W. Dahn
Attorney Dec. 13, 1955 L. STANETZKI 2,726,900
WHEEL FASTENINGS FOR MOTOR AND OTHER VEHICLES
Filed Jan. 9, 1950 2 Sheets-Sheet 2
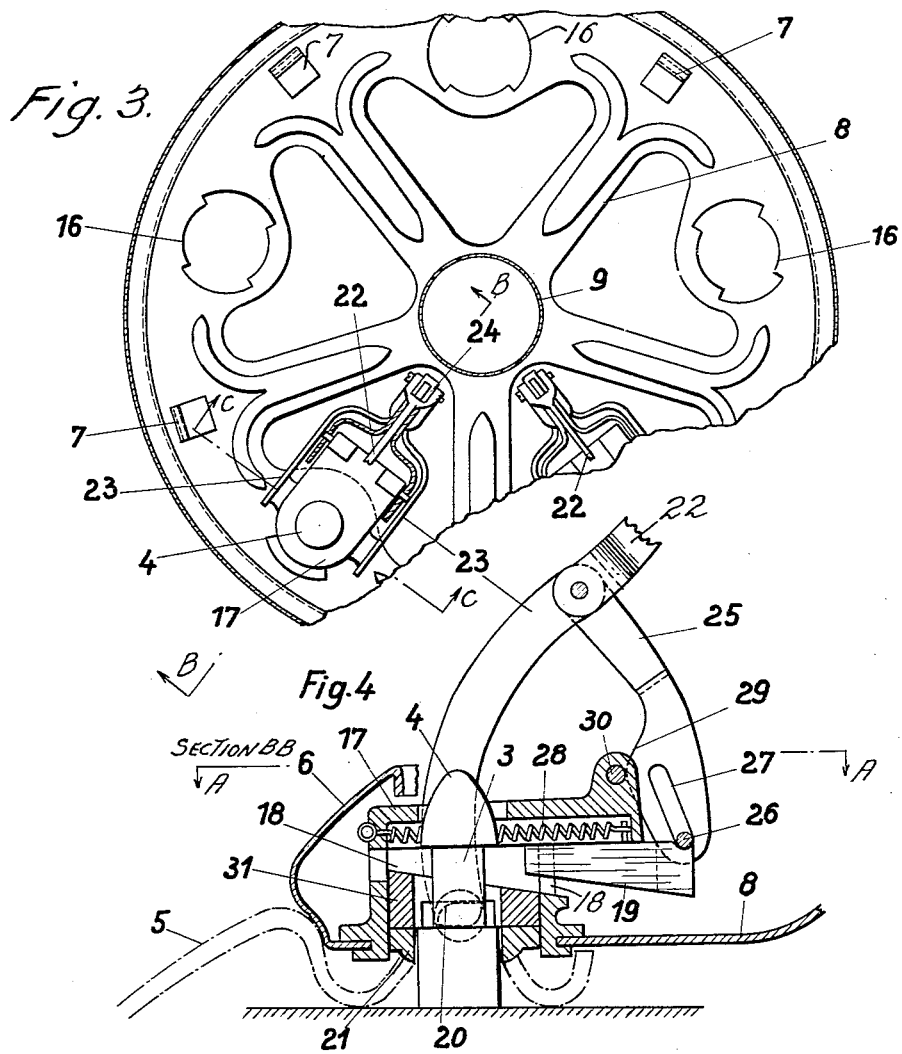
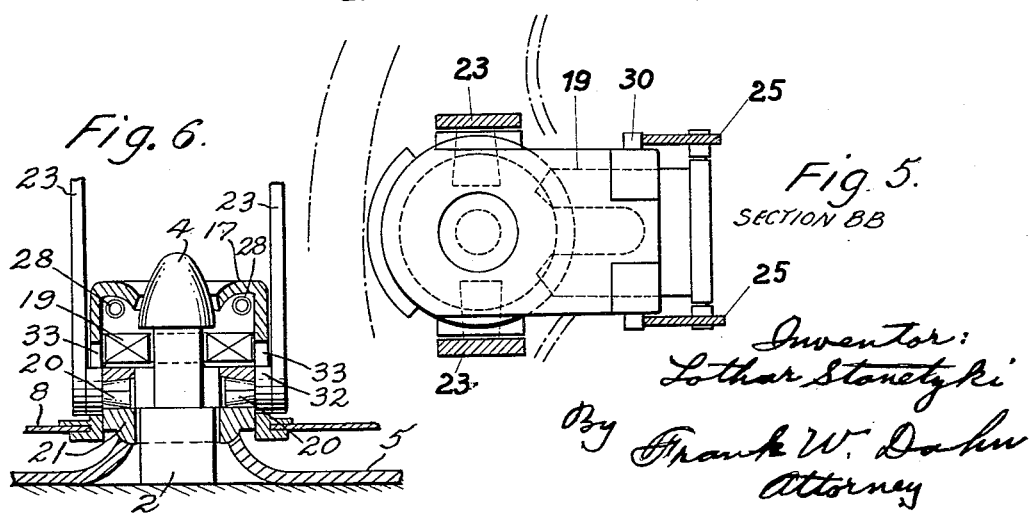

2,726,900

WHEEL FASTENINGS FOR MOTOR AND OTHER VEHICLES

Lothar Stanetzki, Bonn (Rhine), Germany, assignor of three-fourths to Herman Streuber, Winnipeg, Manitoba, Canada Application January 9, 1950, Serial No. 137,637

13 Claims. (Cl. 301—9)

In the wheel fastenings of customary construction for motor vehicles the wheel hub has a number of axially extending screw bolts by means of which the wheel disk is fixed to the wheel hub.

This known construction has some remarkable disadvantages. First of all, it requires constant and careful surveyance of all bolts or nuts as to whether or not they are properly seated. Besides, tightening the nuts and even more unscrewing them is wearisome and usually can only be performed with the aid of specialty tools and with a substantial expenditure of power. It may also easily occur that in these manipulations the threads of the screws are damaged, thereby rendering the applying or withdrawing of the wheels even more difficult. Finally, with the known construction details, such as nuts, are easily lost or get clogged, whereby the safety of driving is seriously affected.

Attempts have been made to lessen these disadvantages, e. g., by providing the axle end with a single external thread on which to screw a nut designed to forcibly hold the wheel disk in its driving position. Yet, this construction too has the disadvantage of making a constant surveyance of the nut necessary and involving the danger of the thread being damaged the same as with the first-mentioned construction. Moreover, tightening and unscrewing of those axle nuts can no more be carried out by means of ordinary wrenches but implies the use of some impact tool by which, however, the lock is frequently damaged, and this sometimes to an extent that makes it unfit for further use.

It has further been tried to solve the problem in question by devising locking devices for securing the wheel disk in its driving position, these devices being constructed to act on the several hub bolts through one common element.

This construction doubtlessly means a considerable progress over the art, but nevertheless it has not been adopted for general use in actual practice, since it proved not to be sufficiently reliable and efficient for reasons hitherto not fully explained.

Thorough investigations and tests have disclosed that with the known embodiments it was not possible to have all bolt locks through the action of their common operating element take their locking position in such an equally reliable manner as to secure a firm seating of all parts. On the contrary, there was entailed a play with some elements in the very moment when other elements that became effective first had assumed an ideal position.

This recognition led to the present invention the primary object of which is to provide a wheel-fastening comprising bolt locks directly or indirectly detachable with the wheel disk and adapted to be operated by one common element, yet of a construction with which, while it allows of all locks being actuated by a single manipulation, the actuation of each lock is nevertheless an individual one.

According to a preferred form of the invention use is made of locks adapted to continuously and automatically compensate, for instance through springs or centrifugal force, any play that might arise.

Such a device may consist of a lock that acts between a hub bolt and the wheel disk and of tightening means between the lock and the wheel disk that enter into action subsequently and produce the initial pressure required between the wheel disk and the wheel hub.

The common operating element for the bolt locks may be formed by a movable part of the hub cap, preferably the central part thereof.

According to the invention, each of the bolt locks is preferably formed by a wedge which cooperates with a suitable face of the corresponding bolt, all wedges being connected through a lever mechanism with the common operating element.

According to another feature of the invention, each wedge is guided in a bush preferably detachably mounted on the wheel disk or the cap base and having an axially extending bore for receiving a hub bolt.

The invention further provides to mount in the wedge guide bush an eccentric or the like with which the lever mechanism is operatively connected and which when operated produces the initial pressure between the hub bolt lock and the wheel disk, the eccentric being preferably formed and arranged so as to have its operative position beyond its dead centre.

The invention finally resides in a construction of the lever mechanism which does not allow the tightening means between the wedges and the wheel disk to enter into operation before the hub bolts have been locked.

The invention will now be described with reference to the annexed drawings which illustrate by way of example an embodiment of the wheel fastening according to the invention.

In the drawings:

Fig. 1 is a fractional axial section of the wheel fastening with the parts of the locking mechanism in their inoperative position before applying the wheel to the hub, Fig. 2 is a similar section with the parts in their locking position, Fig. 3 is a sectional plan view of the base of the hub cap, Fig. 4 is an axial section of one of the bolt locks on line B—B, Fig. 3.

Fig. 5 is a sectional plan view of this lock and

Fig. 6, a section on line C—C of Fig. 3.

The wheel hub 1 is provided in the usual way with the axially extending wheel fastening bolts or studs 2 which, however, have no thread but an annular groove 3 and a mushroom-shaped free end 4.

5 is the wheel disk and 6 the base of the hub cap which is detachably held on the disk 5 by means of spring catches 7. The inner portion of the base 6 is in the form of a spoke-shaped bottom 8 having an internal rim 9 which is bent to form a funnel corresponding in shape to the hub end 10.

The cap base 6 carries a withdrawable central cap part 11 which is provided with a lock 13 designed to secure the part 11 in its closing position. The free end of the funnel-shaped cap portion 9 has an inwardly bent edge 12 designed to cooperate with the bolts 14 of the lock 13. The lock has a keyhole 15 that may be provided with a suitable cover.

As shown in Fig. 3, the bottom 8 of the cap base 6 is provided with oblong openings 16 for the mounting therein of guide bushes 17, each of which has a central bore lying parallel to the wheel axis and designed each to receive one of the hub bolts 2. As illustrated in detail in Figs. 4 and 5 each of the bushes 17 has a transverse passage 18 extending vertically to the wheel axis and adapted each to receive and guide a wedge 19. Each bush also has mounted in it a shaft 20, Fig. 4, shaped so as to act like an eccentric. This shaft bears from below against a filling piece 31, which is vertically shiftable in the bush 17 and forms the lower surface of the wedge-shaped passage 18. The excentric shafts 20 are mounted in their housings 17 by means of the cylindrical end portions 32 which are fitted loosely into corresponding slots 33 of housing 17 (Fig. 6). On the other hand, the shaft 20 bears on a cone 21, Fig. 4, which projects downwardly from the bush 17, is held by same on the cap bottom 8, and has an axial bore through which to introduce one of the hub bolts 2. This bore performs a centering action on the bolt when being introduced. In the locking position of the mechanism each cone 21 seats itself in one of the bolt holes of the wheel disk, as may be seen from Fig. 2. The cones 21 thus provide for a perfectly uniform bearing of the cap base 6 and its associated parts on the wheel disk 5. During the clamping operation the eccentric portion of the shaft forces the cone 21 and the filling piece 31 away from each other. Thus the eccentric portion functions to force filler 31 away from cone 21. But the engagement of filler 31 with the wedge 19 prevents further movement of the filler, and therefore rotation of the eccentric shaft 20 presses the cone 21 against disk 5 and so causes effective pressure of said disk against hub 1.

As disclosed by Fig. 1, a toggle lever 22—23 is pivoted by one end to the cap part 11 and rigidly connected by its other end to the tightening shaft 20, while the toggle joint 24 has pivotally connected to its pin a lever 25 which is operatively connected by a slot and pin connection 26—27 with the wedge 19. The lever 25 is under the action of a tension spring 28, Fig. 4, which normally forces it into its locking position. The slot 27 is arranged and formed so as to allow an ineffective motion of the lever 25 from its inoperative position but prevent a withdrawal of the wedge 19 from its operative position, while it permits the wedge to advance further into its effective locking position.

The lever 25 forms at its back a cam face 29 which cooperates with a fixed stop 30 of the bush 17.

In applying a wheel disk 5 equipped with the mechanism according to the invention to the wheel hub 1, the disk with the funnel 9 of the cap base 6 as a guide is so pushed onto the axle end 10 that the hub bolts 2 each will be introduced through one of the cones 21 into the corresponding bush 17. Thereupon, it is only necessary to apply the cap part 11, which till then was in its drawn-out position, to the cap base 6. This can be done by a light axial pressure which may even be exerted by a child. The central cap part 11 is secured in its position on the cap base 6 by means of the lock 12—13—14—15. The said axial movement of the cap part 11 causes all toggle levers 22—23 to collapse and assume their locking position, which is illustrated in Fig. 2. By turning the excentric shaft 20 by means of toggle levers 23, filling pieces 31 and cones 21 are pressed apart. At the same time the wedges 19 governed by the levers 25, which first move towards the bottom 8 and then tilt, and acted upon by the tension springs 28 are likewise moved into their locking position, and this in an individual manner, i. e. in accordance with the particular conditions with which each of the wedges meets. In this movement the wedges are pressed so far into their bushes 17 that each of them snugly engages the annular groove 3 of the respective hub bolt 2.

In the described operation of the cap part 11 the slot and pin connection 26—27 will allow proper movement of the wedges 12 only in case same do not meet with any resistance. In the other case, the levers 25 will strike by their free ends against the cap bottom 8 and thereby bar the closing down of the cap part 11 on the cap base 6. This construction, therefore, automatically indicates any defect or disturbance of the wheel fastening means and implies remedying the defect before the wheel disk 5 can be applied definitively.

Shortly after the individual locking by the wedges 19 has been attained through the collapsing movement of the toggle levers 22—23, same also turn the eccentric-like shafts 20 into their operative position so that they will bear against the cones 21 and the filling pieces 31 and press the latter against the wedges, thereby producing from the beginning the necessary bearing pressure between the wheel disk 5 and the wheel hub 1. The final position of the tightening shafts 20 lies beyond their dead centre, whereby an additional locking of the toggle levers against unintentional return movements is attained.

Any play that might arise through strain or wear in the use of the mechanism, will be compensated continuously and automatically by the action of the tension springs 28, which with the assistance of the centrifugal force constantly force the wedges into their most efficient locking position and thereby hold all cooperating parts in most intimate mutual contact.

Removing the wheel disk 5 from the hub 1 merely requires opening the lock 13 and withdrawing the cap part 11 from the cap base 6 by an axially directed light pull, which again can be exerted by a child. This movement stretches the toggle levers 22—23, in result whereof the tightening shafts 20 are turned back to their inoperative position in which they release the filling pieces 31 and consequently the wedges 19, whereupon the wedges, governed by the levers 25 sliding with their cam faces 29 on the fixed stops 30, are withdrawn into their inoperative position contrary to the action of the springs 28 and release the hub bolts 2.

The described device, which comprises only some few elements of cheap and simple make, allows a wheel to be applied and withdrawn in the extremely short time of 2 seconds at the most. No tool is required for its operation, and any unskilled person can handle it with a single manipulation, practically without any expenditure of power, in complete darkness, and without any risk of dirtying his hands or parts of the device. It is absolutely safe in operation and comprises no loose parts that might get lost in handling the device or parts, such as threaded members, which are liable to be easily damaged.

It is a particular advantage of the novel construction that it is applicable to any car of known type, the only alteration required being that of replacing the ordinary screw bolts by hub bolts of the design described. Finally, the device lends itself extremely well for mass production without the use of specialty machines.

Having thus described my invention, what I claim and desire to secure by Letters Patent is:

1. A wheel fastening comprising a hub with a number of fastening bolts for the wheel disk, a hub cap consisting of a base detachably fixed to the wheel disk and a central part axially movable relatively to the cap base, guide bushes removably supported by the cap base, a central bore in the bushes for receiving the hub bolts, wedges carried by the cap base for cooperation with the hub bolts, transverse passages in the guide bushes into and out of which the wedges may be moved for being put into and out of locking engagement with the hub bolts, and lever connections between the wedges and the movable central cap part.

2. A wheel fastening as defined in claim 1 wherein eccentric-like elements are rotatably mounted in the guide bushes which are designed to act on the wedges and produce the required initial pressure between the bolt locks and the wheel disk, these eccentric-like elements being connected with the transmission levers and adapted to be operated by the movement of the movable cap part.

3. A wheel fastening as defined in claim 2 wherein the eccentric-like elements are of such form and arrangement that their operative position lies beyond their dead centre.

4. A wheel fastening as defined in claim 3 wherein the lever transmission is of such construction that the eccentric-like elements can only be turned into their operative position after the wedges have assumed their locking position relatively to the hub bolts.

5. A wheel fastening comprising a hub with a number of fastening bolts for the wheel disk, a hub cap consisting of a base portion detachably fixed to the wheel disk and a central part axially movable relatively to the cap base, guide bushes removably fastened to the cap base and having axial bores for receiving the hub bolts, wedges associated with the said bushes and adapted to be moved into and out of transverse passages of the bushes for entering into and out of locking engagement with the hub bolts, eccentrics mounted in the bushes for acting on the wedges to produce the required bearing pressure between the bolt locks and the wheel disk, toggle levers rigidly fastened by one end to the said eccentrics and pivoted by their other end to the movable cap part, means tending to force the wedges into their locking position relatively to the hub bolts, and operating levers for the wedges having a slot and pin connection with the wedges and adapted to withdraw them from their locking position.

6. A wheel fastening as defined in claim 5 wherein the operating levers for the wedges are pivoted to the joint of the toggle levers and provided with a cam face which slidably bears against a fixed stop under the action of the means forcing the wedges into their locking position.

7. A wheel fastening as defined in claim 6 wherein the stops for the cam faces of the wedge operating levers are fixed on the guide bushes.

8. A wheel fastening as defined in claim 5 wherein the slot and pin connection between the wedges and their operating levers permits a dead movement of the operating lever from its inoperative position if the wedge meets with some obstacle, but prevents withdrawal of the wedge from its locking position without impeding its advance into the locking position.

9. A wheel fastening comprising a hub with a number of fastening bolts for the wheel disk, a hub cap consisting of a base detachably fixed to the wheel disk and a central part axially movable relatively to the cap base, a funnel-shaped guide formed by the cap base centrally thereof and adapted to fit the end of the hub in placing the wheel thereon, locks carried by the cap base for cooperation with the hub bolts, and transmission means between the said locks and the movable cap part.

10. A wheel fastening as defined in claim 1 wherein a key-operated lock is provided between the two parts of the hub cap for safely holding these parts together in the locking position.

11. A wheel fastening as defined in claim 10 wherein the said lock is of such construction that it can be closed without a key, but opened only with a key.

12. A wheel fastening as defined in claim 1 wherein each guide bush has at the end by which it is mounted in the wheel disk a cone adapted to compensate tolerances of the bearing face of the wheel disk.

13. A wheel fastening for a wheel having a disk, comprising a hub, a plurality of studs on the hub, a hubcap having a base detachably secured to the wheel disk, a plurality of locks on said base, each lock coacting with one of said studs, a central hubcap portion axially movable with respect to the base portion, and connections from said axially movable portion to said locks for moving them into and out of engagement with said studs.

References Cited in the file of this patent

UNITED STATES PATENTS

| | | |
|---|---|---|
| 1,939,114 | Ficken | Dec. 12, 1933 |
| 2,005,535 | Duarte | June 18, 1935 |
| 2,029,866 | Haberl | Feb. 4, 1936 |
| 2,178,734 | Woods | Nov. 7, 1939 |
| 2,205,301 | Martin | June 18, 1940 |
| 2,212,592 | Manghi | Aug. 27, 1940 |

FOREIGN PATENTS

| | | |
|---|---|---|
| 500,355 | Great Britain | Feb. 7, 1939 |